United States Patent Office 3,017,398
Patented Jan. 16, 1962

3,017,398
TEMPERATURE CONTROL IN LOW TEMPERATURE POLYMERIZATIONS
Donald H. Welch, Lake Charles, La., and Charles A. McKenzie and Robert F. Killey, Sarnia, Ontario, Canada, assignors to Polymer Corporation Limited, Sarnia, Ontario, Canada, a corporation
No Drawing. Filed June 12, 1959, Ser. No. 819,806
Claims priority, application Canada June 30, 1955
7 Claims. (Cl. 260—85.3)

This invention relates to the low temperature catalytic polymerization of isoolefinic material, more particularly isobutylene, with or without copolymerizable materials. The term "polymerization" includes "copolymerization," for example the copolymerization of isoolefinic material with multi-olefinic material.

It has previously been suggested that it is possible to polymerize isoolefinic materials such as isobutylene, either alone or mixed with a multi-olefin, such as butadiene-1,3 or isoprene, at temperatures as low as —164° C. (—264° F.) under the influence of a Friedel-Crafts type catalyst, such as aluminum chloride or boron trifluoride. It has been suggested to use a non-complex-forming, inert, low freezing diluent, which was a non-solvent for the final polymer, such as methyl chloride or ethyl chloride, as the reaction medium. In these polymerizations, the molecular weights of the polymers are said to range as high as 500,000.

It has been suggested carrying out these polymerizations in a reaction vessel having a large diameter central tube surrounded by a plurality of small diameter tubes. The large tube and small tubes formed a plurality of circulating passages for the reactor contents. These tubes were surrounded by a cooling jacket through which a refrigerant solution would pass. This reactor was also equipped with an agitator for circulating the reactor contents, inlet tubes for the feeding of the monomer solutions and the catalyst solutions, and normally, an outlet tube.

The previously suggested method of starting up and carrying out the polymerization of isobutylene with isoprene has been to use an apparatus as described above and to follow the sequence of steps given below:

(1) Circulate refrigerant through the cooling jacket of the reactor,
(2) Fill the reactor with "dilute feed,"
(3) Add some pure isoprene to the reactor,
(4) Start the flow of "full strength feed" to the reactor,
(5) Start the agitator located within the reactor, and
(6) Start the addition of the catalyst when the isobutylene content reaches about 10–12% by weight.

The type of polymer formed in this reaction is known as "butyl rubber." In this application, "butyl rubber" is taken to mean the vulcanizable elastic copolymers of isobutylene and small amounts of diolefins.

The term "dilute feed" is here meant to mean a solution containing less than about 8% by weight, preferably about 2–6% by weight of an isoolefinic material, such as isobutylene, in an inert diluent such as methyl chloride.

The term "full strength feed" is here meant to mean a solution containing about 20–40% by weight, preferably about 25–35% by weight of an isoolefinic material such as isobutylene, with or without about 0.2–6.0% by weight, preferably about 0.25–4.0% by weight of a multi-olefin having at least two centres of unsaturation, such as isoprene, in an inert diluent such as methyl chloride.

In this previously suggested method of polymerization, the same refrigeration system was used to cool both the reactor contents and the feed entering the reactor, i.e. the temperature of the refrigerant for the feed chillers and the cooling jacket has been the same.

It has been found that at cooling jacket temperatures below —155° F. the operations have not been successful. It has been found that the feed, by passage through feed chillers in indirect heat exchange relation with the refrigerant, often froze in the feed chillers. This then resulted in the filling operation being sufficiently protracted that freeze-up or partial freeze-up of the contents of the circulating passages in the reactor took place. It was found also that at such temperatures which are appreciably below the freezing point of the reactor contents, the reaction was of short duration due to freezing or plugging of the reactant feed lines, catalyst feed lines, and the circulating passages.

Even if freezing-up difficulties were not encountered, it was found that the induction periods associated with the use of feed at such temperatures were quite long, i.e. as much as 2 hours, resulting in serious losses in production.

Therefore, as pointed out more specifically hereinabove, it was not heretofore practicable to carry out the reaction at cooling jacket temperatures more than 10 Fahrenheit degrees lower than the freezing point of the reactor contents. The production runs have continued to be of limited duration because of the tendency of the polymer to deposit on the interior surfaces of the reactor, in the circulating passages and on the agitator. As this layer of polymer accumulated, the temperature differential between the reactor contents and the refrigerant jacket increased, i.e. the temperature of the reactor contents increased. It is well known that a desirable polymer is not produced when the reaction temperature becomes too high and that low temperature polymerization, i.e. at temperatures approximating the freezing point of the reactor contents, is the more desirable type.

However, successful commercial operations have not previously been carried out at cooling jacket temperatures lower than —155° F.

If the difficulties inherent in this low temperature polymerization were overcome, much longer runs between reactor cleanings would result because of the greatly reduced amount of deposit of the polymer. The decrease in the fouling of the reactor is due to two factors: the presence of a film of frozen diluent on the inner walls of the reactor; and the production of less tacky polymers at these temperatures.

It is therefore an object of this invention to provide a method by which continuous polymerization of an isoolefin, such as isobutylene, may take place using cooling jacket temperatures lower than —155° F.

It is a further object of this invention to provide a method of obtaining higher production through the use of higher concentrations of isobutylene and isoprene in the feed without increasing the load on the monomer recovery system, this being obtainable by virtue of the low reactor temperatures.

It is also a subsidiary object of this invention to provide a method for reducing the shock to the metallic structure of the reactors caused by the thermal strains resulting from the circulation of refrigerant through the cooling unit of an otherwise empty reactor, according to the prior reactor cleaning process which will be described below:

The objects of the present invention are attained by a process which involves a correlation between the sequence of steps followed during the start-up of the reactor and the temperatures of the various ingredients involved in the process. The present invention employs a process for the low temperature copolymerization of isobutylene with a $C_4$ to $C_{14}$ multiolefinic hydrocarbon in a reaction zone having reactant circulating passages surrounded by refrigerant circulating passages which comprises the following steps in sequence: (A) feeding into the reaction zone so as to substantially fill said reactant circulating passages a pre-cooled reactant feed solution including, inter alia, 2–40 weight percent isobutylene, 0.2–6.0 weight percent $C_4$ to $C_{14}$ multiolefinic hydrocarbon, and 54–98 weight percent methyl chloride, at a temperature above its freezing point but below a temperature defined by TM in the equation $$TM = X - (Y - Z)$$

where

TM is the upper temperature limit in Fahrenheit degrees of the reactant feed solution,
X is −155
Y is the actual temperature in Fahrenheit degrees of the refrigerant when it is fed to the refrigerant circulating passages, and
Z is −145;

(B) when said reactant circulating passages are substantially filled, commencing circulation of said reactant feed solution in said reactant circulating passages; (C) feeding a refrigerant into said refrigerant circulating passages and circulating it therein, said refrigerant being fed at a temperature lower than −155° F.; and (D) initiating the copolymerization reaction by feeding into the reaction zone a pre-cooled catalyst solution including, inter alia, methyl chloride containing up to 3.0 weight percent dissolved Friedel-Crafts catalyst and up to 1.5 weight percent of a reaction promoter, at a temperature above its freezing point but below a temperature defined by TC in the equation $TC = P - (Q)(R)$, where TC is the upper temperature limit in Fahrenheit degrees of the catalyst feed solution to the reaction zone,
P is the actual temperature of the reactant feed solution in Fahrenheit degrees,
Q is the numerical difference between the upper temperature limit in Fahrenheit degrees of the reactant feed solution and the actual temperature in Fahrenheit degrees of the reactant feed solution, and
R is the ratio of the volume of reactant feed solution to the volume of catalyst feed solution being fed to the reaction zone.

The principal process of the present invention is for the production of "butyl rubber." In one suitable form, the present invention provides a method for the low temperature copolymerization of isobutylene, with a multi-olefinic material containing 4–14 carbon atoms and having at least two centres of unsaturation, such as isoprene, in a reactor having circulating passages and a cooling jacket comprising feeding into the reactor so as substantially to fill said passages, a dilute feed of said isobutylene in methyl chloride, said dilute feed being fed at a temperature above its freezing point; then circulating this solution through said passages; then circulating in said cooling jacket a refrigerant at a temperature below −155° F. and feeding a full strength feed of said isobutylene and said multi-olefinic material in methyl chloride at a correlated rate so that when said refrigerant completely fills said cooling jacket, the contents of the reactor is a solution of the required concentration of monomers; and then feeding a solution of a Friedel-Crafts catalyst in methyl chloride, said solution of catalyst being fed at a temperature above its freezing point. Preferably, these solutions are fed continuously, so that the overflow from one reactor is used to fill another reactor. Such a continuous process is extremely advantageous, although the examples given herein are not specifically related thereto.

It is intended that this invention be limited to those cases where there is a film of frozen feed liquid on the heat exchange surfaces separating the reactant circulating passages from the refrigerant circulating passages in the reactor. When methyl chloride is used as diluent and the refrigerant temperature is −155° F., the warmest temperature for the monomer feed liquid which can be tolerated and still maintain the temperature of the reacting mixture at its freezing point and thus maintain a film of frozen feed liquid on the heat exchange surfaces, is −145° F. Similarly, at refrigerant temperatures of −160° F., −165° F. and −170° F. the warmest tolerable temperatures for the monomer feed liquid are −140° F., −135° F. and −130° F., respectively. These values are determined by solving for TM in the following equation: $TM = X - (Y - Z)$ TM = upper temperature limit in Fahrenheit degrees of the monomer feed solution to the reactor.
X = −155 (a constant representing the highest permissible temperature in Fahrenheit degrees for the refrigerant in the reactor jacket).
Y = actual temperature in Fahrenheit degrees of the refrigerant in the reactor jacket.
Z = −145 (a constant closely approximating the freezing point in Fahrenheit degrees of the reactor contents after the reaction has started).

Taking, for example, a refrigerant temperature of −160° F.

$$TM = -155 - (-160 - [-145]) = -140° \text{ F.}$$

The ratio of the volume of monomer feed to the volume of catalyst feed to the reactor may vary widely but will normally be between 5/1 and 25/1. Thus it is evident that the effect of catalyst feed temperature on the temperature of the reacting mixture within the reactor will be small compared to the temperature of the monomer feed. Therefore considerably higher catalyst feed temperatures may be tolerated before there is a significant effect on the maintenance of a frozen film on the heat exchange surfaces. For example, at a ratio of 10/1 of volume of monomer feed to volume of catalyst feed, a refrigerant temperature of −160° F. and a monomer feed temperature of −141° F., the catalyst feed temperature would have to rise to −131° F. to serve an effect equivalent to a monomer feed temperature rise of 1 Fahrenheit degree to −140° F. (the upper tolerable temperature limit for the monomer feed). Under similar conditions but using monomer feed temperatures of −142° F. and −143° F. the tolerable upper temperature limit for the catalyst feed would be −122° F. and −113° F., respectively. These values are determined by solving for TC in the following equation: $TC = P - (Q)(R)$, where TC = upper temperature limit in Fahrenheit degrees of the catalyst feed to the reactor.
P = actual temperature of monomer feed in Fahrenheit degrees.
Q = numerical difference between upper temperature limit of monomer feed and actual temperature of the monomer feed.
R = ratio of volume of monomer feed to volume of catalyst feed.

Taking for example a monomer feed temperature of −143° F., a refrigerant temperature of −160° F. (this gives an upper temperature limit of monomer feed to the reactor of −140° F.) and a volume ratio of monomer feed to catalyst feed of $$10/1: TC = -143 - (3)(10) = -113° \text{ F.}$$

It is evident from these calculations that the effect of the temperature of the catalyst feed is minor compared to the effect of the temperature of the monomer feed. Good practice, however, indicates that the temperature of the catalyst feed should not be allowed to be too high since at higher catalyst feed temperatures the reaction tends to be initiated very quickly in the location of the point of entry of the catalyst feed into the reactor. It is desirable that the catalyst feed solution be thoroughly dispersed before its catalytic action is realized, in order to avoid the production of undesirable amounts of lower molecular weight polymer. When such polymer is formed it is due to undissipated, localized tempearture and concentration effects. Catalyst feed temperatures warmer than −100° F. are generally undesirable.

It was the custom to clean the reactor, i.e. to remove the polymeric material deposited on the internal surfaces of the reactor, by circulating hot "Varsol" through the reactor for a short period of time. (Varsol is the trade name for a line of straight petroleum aliphatic solvents manufactured by the Esso Standard Oil Co., New York, N.Y.) The temperature of the Varsol usually was about 150° F. In the old method of polymerization, the cooling jacket refrigerant at a temperature of −150° F. was circulated through the cooling jacket as the first step after the cleaning. It was found that very severe strains, causing the cooling jacket tubes to fail, were induced in the metal structures subjected to a temperature variation of 300 Fahrenheit degrees in a relatively short period of time.

In the present preferred process, however, difficulties of this kind are practically eliminated for the shock to the metallic components, induced by the sudden addition of refrigerant, is substantially dissipated by having the reactor filled and its contents circulating before the refrigerant is pumped into the heat exchanger tubes.

The present invention may be extended to include isoolefins containing 4-8 carbon atoms, such as isobutylene, 3-methyl-butylene-1 and 4-ethylpentene-1. Suitable multiolefins for copolymerization therewith are those containing 4-14 carbon atoms and having at least two centres of unsaturation, such as isoprene, butadiene-1,3, piperylene, hexadiene-2,4, dimethallyl, cyclopentadiene, myrcene, and 6,6-dimethyl-fulvene.

While various of the Friedel-Craft types of catalysts may be dissolved in alkyl halide solvents and used to catalyze the polymerization reaction, aluminum chloride solutions in methyl chloride are normally used. The concentration of catalyst in the solution may run as high as 3.0 weight percent, through concentrations of 0.2% to 0.5% by weight are more conventional. The presence of small amounts of reaction promoters is necessary for best results. These may vary in amounts up to 50% by weight of the catalyst and may take the form of water, hydrogen chloride, etc. In commercial scale operations economical considerations require that unused monomers and diluents be recovered and reused. Since it is almost impossible to obtain complete separation of the various components before reuse, there will be present small amounts of water and various saturated and unsaturated compounds in the various streams. Thus the catalyst stream will contain small amounts of water, isobutylene, butylenes, butanes, etc.

The most useful polymers are prepared by polymerizing a major portion, about 85-99.5 parts, of isobutylene, with a minor portion, about 15-0.5 part of isoprene.

In general, in the preparation of "butyl rubber" by this process, isobuytylene (freezing point −232.2° F.) and isoprene (freezing point −230.6° F.) are copolymerized in a methyl chloride (freezing point −143.9° F.) diluent.

As a more specific illustration a full strength feed, composed of about 24-26% by weight isobutylene, about 0.25-1.0% by weight isoprene in the methyl chloride solvent, has a freezing point of about −157° F. The dilute feed stream, composed of about 2-6% by weight isobutylene in the methyl chloride solvent, has a freezing point of about −145° F. The mixed solution, composed of about 88-90% by weight methyl chloride, 10-12% by weight isobutylene and 0.2-0.5% by weight isoprene, to which the catalyst solution is added, has a freezing point of about −149° F. After the reaction has started and has reached equilibrium, the composition of the liquid portion of the reactor contents has been depleted sufficiently of monomers that its freezing point is now about −145° to −146° F. The use of cooling jacket refrigerant temperatures more than 10 Fahrenheit degrees below this latter range, i.e. at temperatures lower than −155° F., which has hitherto been impractical, is now, according to the present invention, not only practical, but also readily attainable.

The following examples are given to illustrate the invention:

EXAMPLE I

A dilute feed stream consisting of 95.1% by weight methyl chloride of a purity greater than 99% and 4.9% by weight isobutylene of a purity of 98.5% was pumped into a reactor until the reactor was substantially filled. The temperature of this stream was maintained at −142° to −144° F. As soon as the reactor was full, the outlet tube was opened, the agitator started and the flow of refrigerant at a temperature of −160° F. to the heat exchanger was begun. At the same time, a stream of full strength feed, composed of 24.1-24.3% by weight of 98.5% pure isobutylene and 0.97-1.01% weight of 96.0% pure isoprene in a methyl chloride solvent at a temperature of −143° to −144° F. replaced the flow of dilute feed to the reactor.

The rates of flow of the full strength feed and of the refrigerant to the heat exchanger were adjusted so that at the moment the refrigerant had completely filled the cooling jacket, the reactor contents were a solution of about 11% by weight isobutylene and 0.4% by weight isoprene in the methyl chloride. At this time, the introduction of the catalyst was begun.

The catalyst consisted of 0.28-0.31% by weight aluminum chloride in methyl chloride, at a temperature of −112° to −117° F. The catalyst was injected according to the process described and claimed in applicant's copending application Serial No. 533,964, now United States Patent No. 2,815,334. However, the injection of the catalyst according to copending application Serial No. 533,964 merely encourages initiation of the reaction. The extent of the reaction is due solely to the process according to the present invention and is divorced from the results achieved using the reaction initiation according to copending application Serial No. 533,964.

It was found that the reaction started in 18 minutes and continued for 24 hours.

EXAMPLE II

The process of Example I was repeated except that the reactor refrigerator temperature was −170° F. The reaction started in 20 minutes and continued for 21 hours.

EXAMPLE III

The following table lists typical production data for the production of butyl rubber first using the old process and then using the process of the present invention.

Table 1.—Comparison of production data

|  | Old Process | Process According to present invention |
|---|---|---|
| Reactor production, lbs./hr | 1,970 | 2,890 |
| Feed concentration, percent by weight | 19 | 24.3 |
| Feed rate, lbs./hr | 11,700 | 13,200 |
| Heat Exchanger Refrigerant Temperature, °F | −145 | −160 |

This application is a continuation-in-part of copending application Serial No. 531,824, filed August 31, 1955 (now abandoned).

We claim:

1. A process for the low temperature copolymerization of isobutylene with a $C_4$ to $C_{14}$ multi-olefinic hydrocarbon in a reaction zone having reactant circulating passages surrounded by refrigerant circulating passages said reaction zone thereby being provided with internal heat exchange surfaces, said process comprising the following steps in sequence: (A) feeding into the reaction zone so as to substantially fill said reactant circulating passages a pre-cooled reactant feed solution including, inter alia, 2–40 weight percent isobutylene, 0–6.0 weight percent $C_4$ to $C_{14}$ multi-olefinic hydrocarbon, and 54–98 weight percent methyl chloride, at a temperature above its freezing point but below a temperature defined by TM in the equation $TM = X - (Y - Z)$ where TM is the upper temperature limit in Fahrenheit degrees of the reactant feed solution,
X is $-155$
Y is the actual temperature in Fahrenheit degrees of the refrigerant when it is fed to the refrigerant circulating passages,
and Z is $-145$;

(B) when said reactant circulating passages are substantially filled, commencing circulating of said reactant feed solution in said reactant circulating passages; (C) feeding a refrigerant into said refrigerant circulating passages and circulating it therein, said refrigerant being fed at a temperature lower than $-155°$ F. whereby to cause formation of a film of frozen diluent on the internal heat exchange surfaces of the reaction zone; and (D) initiating the copolymerization reaction by feeding into the reaction zone a pre-cooled catalyst solution including, inter alia, methyl chloride containing up to 3.0 weight percent dissolved Friedel-Crafts catalyst and up to 1.5 weight percent of a reaction promoter, at a temperature above its freezing point but below a temperature defined by TC in the equation $TC = P - (Q)(R)$ where TC is the upper temperature limit in Fahrenheit degrees of the catalyst feed solution to the reaction zone,
P is the actual temperature of the reactant feed solution in Fahrenheit degrees,
Q is the numerical difference between the upper temperature limit in Fahrenheit degrees of the reactant feed solution and the actual temperature in Fahrenheit degrees of the reactant feed solution,
and R is the ratio of the volume of reactant feed solution to the volume of catalyst feed solution being fed to the reaction zone.

2. The process of claim 1 wherein the $C_4$ to $C_{14}$ multi-olefinic hydrocarbon is isoprene.

3. The process of claim 1 wherein the Friedel-Crafts catalyst is aluminum chloride.

4. A process for the low temperature copolymerization of isobutylene with a $C_4$ to $C_{14}$ multi-olefinic hydrocarbon in a reaction zone having reactant circulating passages surrounded by refrigerant circulating passages said reaction zone thereby being provided with internal heat exchange surfaces, said process comprising the following steps in sequence: (A) feeding into the reaction zone so as substantially to fill said reactant circulating passages a pre-cooled dilute reactant feed solution including, inter alia, 2–8 weight percent isobutylene and 92–98 weight percent methyl chloride, at a temperature above its freezing point but below a temperature defined by $TM_{(d)}$ in the equation $TM_{(d)} = X - (Y - Z)$ where $TM_{(d)}$ is the upper temperature limit in Fahrenheit degrees of the dilute reactant feed solution,
X is $-155$,
Y is the actual temperature in Fahrenheit degrees of the refrigerant when it is fed to the refrigerant circulating passages
and Z is $-145$;

(B) when said reactant circulating passages are substantially filled, commencing circulation of said dilute reactant feed solution in said reactant circulating passages; (C) substantially simultaneously feeding a refrigerant into said refrigerant circulation passages and circulating it therein, said refrigerant being fed at a temperature lower than $-155°$ F. whereby to cause formation of a film of frozen diluent on the internal heat exchange surfaces of the reaction zone; (D) terminating the feeding of said dilute reactant feed solution into said reaction zone and commencing the feeding of a pre-cooled full strength reactant feed solution including, inter alia, 20–40 weight percent isobutylene, 0.2–6.0 weight percent $C_4$ to $C_{14}$ multi-olefinic hydrocarbon and 54–74 weight percent methyl chloride at a temperature above its freezing point but below a temperature defined by $TM_{(f)}$ in the equation $$TM_{(f)} = X - (Y - Z)$$

where $TM_{(f)}$ is the upper temperature limit in Fahrenheit degrees of the full strength reactant feed solution,
X is $-155$,
Y is the actual temperature in Fahrenheit degrees of the refrigerant in the refrigerant circulating passages
and Z is $-145$; and (E) when said refrigerant substantially completely fills said refrigerant circulation passages, initiating the copolymerization reaction by feeding into the reaction zone a pre-cooled catalyst solution including, inter alia, methyl chloride containing up to 3.0 weight percent dissolved Friedel-Crafts catalyst and up to 1.5 weight percent of a reaction promoter at a temperature above its freezing point but below a temperature defined by TC in the equation $TC = P - (Q)(R)$ where TC is the upper temperature limit in Fahrenheit degrees of the catalyst feed solution to the reaction zone,
P is the actual temperature in Fahrenheit degrees of the full strength reactant feed solution,
Q is the numerical difference between the upper temperature limit in Fahrenheit degrees of the reactant feed solution and the actual temperature in Fahrenheit degrees of the full strength reactant feed solution,
and R is the ratio of the volume of full strength reactant feed solution to the volume of the catalyst feed solution being fed to the reaction zone.

5. The process of claim 4 wherein the Friedel-Crafts catalyst is aluminum chloride.

6. The process of claim 4 wherein the $C_4$ to $C_{14}$ multi-olefinic hydrocarbon is isoprene.

7. A process for the low temperature copolymerization of isobutylene with isoprene in a reaction zone having reactant circulating passages said reaction zone thereby being provided with internal heat exchange surfaces, said process surrounded by refrigerant circulating passages, comprising the following steps in sequence: (A) feeding, into the reaction zone so as substantially to fill said reactant circulating passages, a pre-cooled dilute reactant feed solution including, inter alia, about 4.9 percent by weight isobutylene of a purity of about 98.5 percent and about 95.1 percent by weight methyl chloride of a purity greater than about 99 percent, at a temperature of about $-142°$ to about $-144°$ F.; (B) when said reactant circulating passages are substantially filled, commencing circulation of said dilute reactant feed solution in said reactant circulating passages; (C) substantially simultaneously feeding a refrigerant into said refrigerant circulation passages and circulating it therein, said refrigerant being fed at a temperature of about $-160°$ F. whereby to cause formation of a film of frozen diluent on the internal heat exchange surfaces of the reaction zone; (D) terminating the feeding of said dilute reactant feed solution into said reaction zone and commencing the feeding of a pre-cooled full strength reactant feed solution including, inter alia, about 24.1–24.3 percent by weight of about 98.5 percent pure isobutylene and about 0.97 to about 1.01 percent by weight of about 96.0 percent pure isoprene in a methyl chloride solvent of purity greater than about 99 percent, at a temperature of about −143° to about −144° F.; and (E) when said refrigerant substantially completely fills said refrigerant circulation passages, initiating the copolymerization reaction by feeding into the reaction zone a pre-cooled catalyst solution including, inter alia, methyl chloride, of purity greater than about 99 percent containing about 0.28 to about 0.31 percent by weight aluminum chloride, at a temperature of about 112° F. to about 117° F.

References Cited in the file of this patent

UNITED STATES PATENTS

| | | |
|---|---|---|
| 2,636,025 | Howe et al. | Apr. 21, 1953 |
| 2,636,026 | Nelson | Apr. 21, 1953 |
| 2,834,762 | McKenzie et al. | May 13, 1958 |